United States Patent
Magnus et al.

(10) Patent No.: US 9,807,224 B2
(45) Date of Patent: Oct. 31, 2017

(54) METHOD AND APPARATUS FOR ACCESSING SERVICES OF A DEVICE

(75) Inventors: Erel Magnus, Middlesex (GB); Simon Hibbard, Middlesex (GB)

(73) Assignee: Samsung Electronics Co., Ltd (KR)

(*) Notice: Subject to any disclaimer, the term of this patent is extended or adjusted under 35 U.S.C. 154(b) by 1113 days.

(21) Appl. No.: 13/050,282

(22) Filed: Mar. 17, 2011

(65) Prior Publication Data
US 2011/0228763 A1 Sep. 22, 2011

(30) Foreign Application Priority Data

Mar. 17, 2010 (GB) .................................. 1004456.8
Mar. 3, 2011 (KR) ......................... 10-2011-0020372

(51) Int. Cl.
| | | |
|---|---|---|
| H04N 21/47 | (2011.01) | |
| H04L 29/06 | (2006.01) | |
| H04M 3/42 | (2006.01) | |
| H04M 1/725 | (2006.01) | |

(52) U.S. Cl.
CPC .............................. H04M 1/72561 (2013.01)

(58) Field of Classification Search
CPC ....... H04L 67/02; H04L 67/125; H04W 4/003
See application file for complete search history.

(56) References Cited

U.S. PATENT DOCUMENTS

| | | | |
|---|---|---|---|
| 5,892,905 A * | 4/1999 | Brandt et al. ................... | 726/11 |
| 6,470,381 B2 | 10/2002 | DeBoor et al. | |
| 7,305,230 B2 | 12/2007 | Zhigang | |
| 8,140,062 B1 * | 3/2012 | Hildner ............... | H04L 41/0806 455/418 |
| 2001/0025307 A1 * | 9/2001 | Venkatraman et al. ...... | 709/218 |
| 2001/0046851 A1 * | 11/2001 | Yamaguchi ................... | 455/412 |
| 2004/0246822 A1 * | 12/2004 | Wong .................. | H04M 3/4938 369/2 |
| 2005/0010656 A1 | 1/2005 | Lee | |
| 2005/0071448 A1 | 3/2005 | Katz et al. | |
| 2006/0045124 A1 * | 3/2006 | Dahlstrom .......... | H04L 63/0236 370/465 |

(Continued)

FOREIGN PATENT DOCUMENTS

| | | |
|---|---|---|
| WO | WO 2005/031568 | 4/2005 |
| WO | WO 2007/138584 | 12/2007 |

*Primary Examiner* — Asad Nawaz
*Assistant Examiner* — Jason Harley
(74) *Attorney, Agent, or Firm* — The Farrell Law Firm, P.C.

(57) ABSTRACT

A telephony device is provided including a display, a processor, and a network interface for communicating via a communications network. The telephony device runs a browser application, a server application, and a service application including services using the processor. The processor controls the server application to recognize a first command request that is provided to the server application using a first transfer protocol via the communications network, and provides instructions to the service application in response to the first command request. The processor controls the service application to control a function of the telephony device by executing a first set of commands, generate a first content, and provide the first content to the server application. The processor controls the server application to generate a first response to the first command request, the first response including the first content.

15 Claims, 6 Drawing Sheets

(56) References Cited

U.S. PATENT DOCUMENTS

2006/0165040 A1* 7/2006 Rathod ................ G06Q 10/10
370/335
2007/0282858 A1* 12/2007 Arner et al. .................... 707/10
2008/0155130 A1* 6/2008 Mosek ........................... 710/11

* cited by examiner

METHOD AND APPARATUS FOR ACCESSING SERVICES OF A DEVICE

PRIORITY

This application claims priority under 35 U.S.C. §119(a) to a Great Britain Patent Application filed in the Great Britain Intellectual Property Office on Mar. 17, 2010 and assigned Serial No. 1004456.8, and of a Korean patent application filed in the Korean Intellectual Property Office on Mar. 3, 2011, and assigned Serial No. 10-2011-0020372, the entire disclosure of each of which is hereby incorporated by reference.

BACKGROUND OF THE INVENTION

1. Field of the Invention

The present invention generally relates to a method and apparatus for accessing services of a device in order to control the functionality of the device.

2. Description of the Related Art

There are many devices that include a number of components whose functionality can be controlled by a user using input devices and a user interfaces displayed on displays of the devices. Typically, specialized programs may be configured to provide user interfaces on the display related to certain aspects of the device only, and may use service applications to control the functionality of certain aspects of the device. Each of these service applications may be configured to use system calls of an operating system running on the device in order to interact with the components of the device, thereby controlling its functionality. For example, a telephony device may include a specialized program for providing a user interface relating to a telephone call, which may use a telephony services application to control a telephone call, and/or may include a specialized program for providing a user interface relating to a list of contacts and a contacts services application for controlling a list of contacts stored in the telephony device, etc. Other devices include a television, set-top box, media player, e-book reader, or digital camera.

These devices may each include an Internet browser that provides access to Internet websites. The Internet browser may also use system calls of the operating system in order to interact with the components of the device. For example, the Internet browser may use a network interface of the telephony device to communicate with Internet websites via a communications network and then display content retrieved from the Internet browser website on the display of the device.

The specialized programs that provide user interfaces for controlling functions of such devices may typically be configured to use specific methods for accessing the service applications of the devices and may not be transferable for use in other devices. This causes a low degree of separation between the specialized programs and the service applications, which makes it difficult to separate the design of the user interface for a device from the design of the programs for controlling functions of the device. Additionally, further specialized means for accessing the service applications must be developed if the device is to be controlled remotely, for example, using a computer or another device. Consequently, it is difficult and costly to develop means for remotely controlling a device.

SUMMARY OF THE INVENTION

As aspect of the present invention is to provide improvements to at least the above-described shortcomings in the prior art by providing a device that allows access to its services via command requests transferred via a standard protocol that are handled by a server application.

In accordance with an aspect of the present invention, a telephony device is provided. The telephony device includes a display, a processor, and a network interface for communicating via a communications network. The telephony device runs a browser application, a server application, and a service application including services using the processor. The processor controls the server application to recognize a first command request that is provided to the server application using a first transfer protocol via the communications network, and provides instructions to the service application in response to the first command request. The processor controls the service application to control a function of the telephony device by executing a first set of commands, generate a first content, and provide the first content to the server application. The processor controls the server application to generate a first response to the first command request, the first response including the first content.

In accordance with another aspect of the present invention, a telephony system is provided. The telephony system includes a first device and a second device. The first device includes a network interface for communicating via a communications network, which is connected to the second device, and a processor that runs service applications. The second device includes a display, a user input device, and a processor. The second device, upon receipt of a first user input from the user input device, transmits a first command request to the first device via the communications network using a first transfer protocol. The first device further includes a server application that recognizes the first command request and provides instructions to a service application, such that the service application executes a first set of one or more commands according to the first command request, in order to control at least one of a telephony function, a messaging function, a connectivity function, and an event function of the first device. The processor of the first device controls the service application to, upon receipt of the instructions from the server application, control the at least one of the telephony function, the messaging function, the connectivity function, and the event function of the first device, and generate a first content to be received by the server application. The processor of the first device controls the server application to generate a first response to the first command request, in response to receipt of the first content, the first response including the first content, and to transmit the first response to the second device. The second device displays a first user interface including the first content on the display of the second device, in response to receipt of the first response.

In accordance with another aspect of the present invention, a method for transmitting a command request to a first device from a second device and receiving a response including content is provided. The first device includes a network interface for conducting communications via a communication network, which is connected to the second device, and a processor that runs a server application and service applications, the second device including a display, a user input device, and a processor. The method includes receiving, at the second device, a first user input from the user input device; transmitting a first command request to the first device using a first transfer protocol via the communications network, in response to receiving the first user input; recognizing, at the server application, the first command request; providing, in response to the first command request, instructions to a service application to execute a first set of commands in order to control at least one of a telephony function, a messaging function, a connectivity function, and an event function of the first device; controlling, at the service application, the at least one of the telephony function, the messaging function, the connectivity function, and the event function of the first device, to generate a first content to be received by the server application, in response to receiving the instructions from the server application; generating, at the server application, a first response to the first command request, the first response including the first content, in response to receiving the first content from the service application; transmitting the first response to the second device; and displaying, at the second device, a first user interface including the first content on the display of the second device, in response to receiving the first content from the service application

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details, such as detailed configuration and components, are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
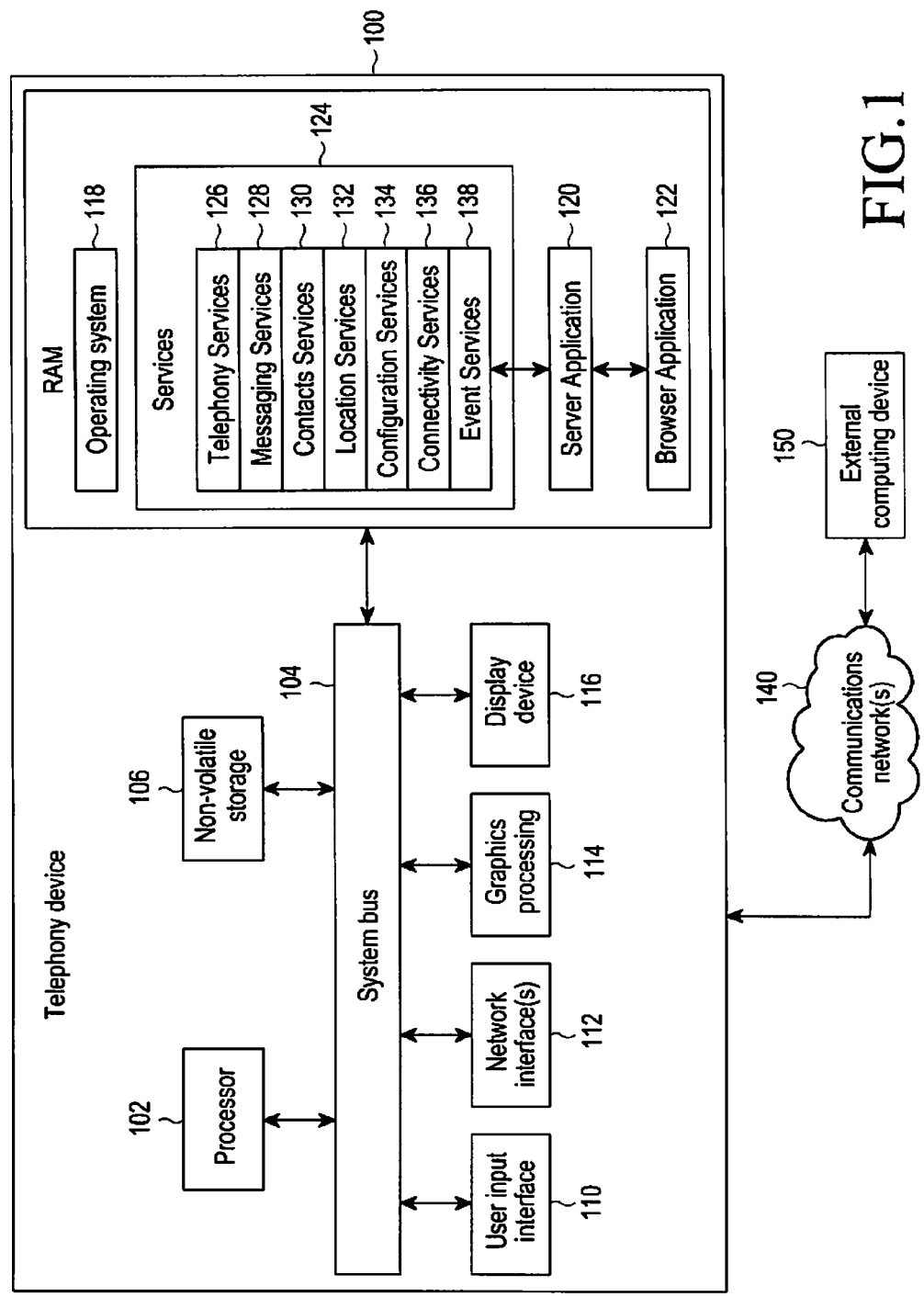
FIG. 1 schematically illustrates a telephony device in accordance with an embodiment of the invention.

FIG. 1 schematically illustrates a telephony device in accordance with an embodiment of the present invention.

Referring to FIG. 1, the telephony device 100 includes a processor 102 that controls and communicates with components within the telephony device 100 via a system bus 104. The components include a non-volatile storage device 106, a Random Access Memory (RAM) 108, a user input interface 110, a network interface 112, and graphics processing component 114. The processor 102, e.g., a microprocessor, processes instructions stored in the RAM 108 that have been loaded from the non-volatile storage device 106, e.g., a flash memory or a hard disk drive. For example, these instructions may be in the form of computer software including one or more programs that implement an operating system 118, a server application 120, a browser application 122, service applications 124, and other programs as will identified below. The RAM 108 is also used by programs running on the processor 102 for storing and accessing data in the form of electronic signals where the data is used during the execution of the programs.

The operating system 118 is computer software is executed when the telephony device 100 is turned on. The operating system 118 may start further programs automatically and/or may allow a user to start further programs, for example, via the user input interface 110. The operating system 118 also shares the processing power provided by the processor 102 between the programs (e.g., 118, 120, 122, 124) running on the processor 102.

The operating system 118 provides a programmatic interface for programs running on the processor 102, allowing them to request functionality from the operating system 118. This programmatic interface may take the form of procedures, i.e., system calls, which a program running on the processor 102 may use in order to invoke the operating system 118 and request it to provide desired functionality.

In response to receiving a request for functionality, the operating system 118 may transmit control messages to, receive status information from, transmit data to and/or receive data from the components connected via the system bus 104 in order to provide the requested functionality, and may also return data to the requesting program as a result.

The telephony device 100 also includes a graphics processing component 114 that renders graphics in accordance with commands made by programs running on the processor 102 and outputs these to a display device 116, which is included within the telephony device 100 in FIG. 1. However, in accordance with alternative embodiment of the present invention, the display device 116 may be an external component connected to the telephony device 100 via a suitable connection, such as a composite video, a component video, a Video Graphics Array, a Digital Visual Interface, a High-Definition Multimedia Interface connection, etc.

Programs running on the processor 102 can process user input obtained from the user input interface 110 that receives user input from a user input device or devices (not shown). The user input devices may include a touch screen interface that may be incorporated within the display device 116. Alternatively or in addition, the user input devices may include a keypad, keyboard, mouse and/or remote control which may be incorporated within the telephony device 100 or may be connected to it, wired or wirelessly.

The telephony device 100 also includes a network interface 112 (or a plurality of such interfaces) that allows programs running on the processor 102 to transmit and receive data to and from a number of other devices and systems via a communications network 140 (or a plurality of such networks).

The network interface 112 may include a modem and/or an Ethernet card or interface for use with a corresponding communications network (or networks) 140 such as the Internet and/or a private data communications network.

The network interface 112 may include a radio access network interface for use with a corresponding communications network 140 such as a radio access network. For example, radio access networks to which the network interface 112 may be able to connect include Global System for Mobile Communications (GSM) networks, Universal Mobile Telecommunications System (UMTS) networks, Long Term Evolution (LTE) networks, fixed wireless access (such as IEEE 802.16 WiMax), and wireless networking (such as IEEE 802.11 WiFi). These radio access networks 140 may also provide access to the Internet.

The operating system 118 may include a networking program for communication between programs running on the processor 112 of the telephony device 100 using networking protocols such as the Transmission Control Protocol (TCP) or the User Datagram Protocol (UDP), as well as communication between programs running on the processor 102 and external devices to which data can be transmitted to and received from via the communications network 140. External devices to which data can be transmitted to and received from via the communications network 140 may include an external computing device 150, e.g., a personal computer or a computer server with a network interface allowing the external communications device to connect to the communications network 150.

The telephony device 100 includes service applications 124 that provide computer programs programmatic functions and procedures for operating the telephony device 100. These programmatic functions and procedures may use the programmatic interface made available by the operating system 118 to operate the components of the telephony device 100. Accordingly, these programmatic functions and procedures form a first plurality of commands that may be used to control the functions of the telephony device 100, and may be used to change the state of the components of the telephony device 100.

The first plurality of commands of the service applications 124 may be made available for use by other programs running on the processor 102. For example, a first command of the first plurality of commands may be called by a first program running on the processor 102 by the first program instructing the operating system 118 to start the appropriate service application 124 with a particular set of parameters specifying the first command.

Alternatively, the first program may communicate with an instance of the appropriate service application 124 running on the processor 102 using a method for inter-process communication made available by the operating system 118, such as a pipe or shared memory, in order to instruct the instance to execute the first command.

In either case, the result of an executed command may be returned to the requesting program from a service application 124 by using an appropriate method of inter-process communication.

The first plurality of commands of the service applications 124 may alternatively or in addition be made available for use by other programs running on the processor 102 via a common interface, such as the Common Gateway Interface (CGI) or the Fast Common Gateway Interface (FastCGI).

The service applications 124 include telephony services 126, messaging services 128, contacts services 130, media services (not shown), social networks services (not shown), configuration services 134, connectivity services 136, event services 138, and data sharing services (not shown), each of which may form one of the programs which the service applications 124 may include.

The telephony services 126 of the telephony device 100 provide commands for controlling the creation and receipt of telephone calls using the telephony device 100 via the network interface 112 and corresponding communications network 140. The telephony services 126 may change the state of the network interface 112 of the telephony device 100 by, for example, using the network interface to create or receive telephone calls.

The messaging services 128 of the telephony device 100 provide commands for controlling the sending and receiving of messages via the network interface 112 and corresponding communications network 140 to other devices. For example, the messages include Short Message Service (SMS) messages, Multimedia Messaging Service (MMS) messages, and e-mails. The messaging services 128 may also provide commands for editing, storing, and retrieving previously sent, received, or drafted messages. The messaging services 128 may change the state of the network interface 112 of the telephony device 100 by, for example, using the network interface to send or receive a text message.

The contacts services 130 of the telephony device 100 provide commands for editing, storing, and retrieving a list of contacts and for editing, storing and retrieving entries in that list, where each entry may include the name and contact details (such as telephone number, e-mail address, etc.) of a contact.

The media services of the telephony device 100 provide commands for storing and retrieving multimedia files that are accessible on the telephony device 100 (e.g., stored in non-volatile storage 106) or to which access is available via the communications network 140. These multimedia files may include sound recordings, music files, image files, and/or video files. The media services may also allow the editing, recording, and/or playback of these multimedia files.

The social networks services of the telephony device 100 provide commands for accessing social networks such as MySpace®, Facebook®, Twitter®, etc., via the communications network 140. Accessing social networks may include authenticating (i.e., logging in) the user of the telephony device 100 with some or all of the social networks using user-entered or pre-stored (e.g., in the non-volatile storage 106) authentication information, and editing, sending, and receiving messages, multimedia files, contact information, and other information using those social networks. The social networks services may change the state of the network interface 112 of the telephony device 100 by, for example, using the network interface to send or receive data to or from a social network in order to conduct the above-described activities.

The location services 132 of the telephony device 100 provide commands for controlling the receipt and use of location information using a location receiver device (not shown), which may be included in the telephony device 100, connected via the system bus 104 of the device. For example, the location receiver device may be a Global Positioning System (GPS) receiver.

The configuration services 134 of the telephony device 100 provide commands for editing, storing, and retrieving settings for the telephony device 100, which may include settings for components connected to the system bus 104, and/or the operating system 118, server application 120, browser application 122, service applications 124, and/or other programs.

The connectivity services 136 of the telephony device 100 provide commands for connecting the network interface 112 of the telephony device 100 to an available communications network 140 and for configuring any such connections to communications networks 140. The connectivity services 136 may change the state of the network interface 112 of the telephony device 100 by, for example, connecting or disconnecting the network interface from a communications network 140.

The event services 138 of the telephony device 100 provide commands allowing other service applications 124 to notify the occurrence of service events in relation to the service applications 124. For example, the service events may include events triggered by any of the components connected via the system bus 104 or by the operating system 118 that are processed by the service applications 124. Examples of service events include an incoming telephone call detected by the network interface 112, which is processed by the telephony services 126, the activation by the operating system 118 of an alarm at a time set by the user, which is processed by the configuration services 134, or receiving a new device location from the location receiver device (not shown) that is processed by the location services 132.

When a service application 124 receives a new service event, it may notify the occurrence of the service event to the event services 138 by passing information relating to the new service event to the event services 138. Information may be passed between the service applications 122 using a method for inter-process communication, and alternatively or in addition, information may be passed between service applications 122 using a common interface, such as using pipes, sockets, shared memory, the CGI or the FastCGI. The event services 138 may then provide the information to other entities that have, via a command of the event services 138, requested to receive information in relation to service events, as will be explained in greater detail below.

The data sharing services of the telephony device 100 provide commands that allow the sharing of data between the telephony device 100 and other devices via the communications network 140. For example, the data sharing services may allow the passing of messages between a program or a script running in the browser application 122 of the telephony device 100 and programs or scripts running in browsers of other devices. These messages may be used to communicate between programs or scripts implementing a game involving multiple players that is being played by the user of the telephony device 100 and users of the other devices, such as for example, a card game.

Alternatively, the messages may be used to share files between the telephony device 100 and other devices. The data sharing services may for example use the event services 138 to notify the receipt of a message from the user of the telephony device 100 or from another device to programs or scripts running in the browser application 122 on the telephony device 100 and/or programs or scripts running in browsers of other devices, e.g., so that new actions made by a player in a game involving multiple players may be received by the programs and scripts running the game on both the telephony device and the other devices.

When a command in the first plurality of commands is used (i.e., executed) by another program running on the processor 102, the state of the telephony device 100 may be changed. For example, the state of the telephony device 100 may be changed by executing one of the commands of the telephony services 126 for making or receiving a telephone call, i.e., the state of the telephony device 100 may be changed from "not in a call" to "in a call". Other examples of commands in the first plurality of commands that may change the state of the telephony device 100 include sending a message using the messaging services 128, editing the details of a contact using the contacts services 130, changing the configuration of the device using the configuration services 134, etc.

In order for a user of the telephony device 100 to use the functionality of the telephony device 100 embodied in the first plurality of commands of the service applications 124, a user interface is provided that is displayed on the display device 116 by the graphics processing device 114. The user may use the user input device or devices to interact with this user interface, thereby controlling the functions of the telephony device 100. In accordance with an embodiment of the present invention the display of and functionality provided by this user interface is managed by both the server application 120 and browser application 122 that may run on the processor 102 of the telephony device 100.

The server application 120 may be a web server, e.g., a HyperText Transfer Protocol (HTTP) server, that uses the service applications 124 to generate content using information available in relation to the telephony device 100 in order to provide a user interface. The service applications 124 may therefore include a set of web services that are accessible via the server application 120. The generated content may be provided to the browser application 122, which will process the content and display it on the display device 116 by appropriately instructing the graphics processing component 114 in order to display a user interface.

Figure 2A:
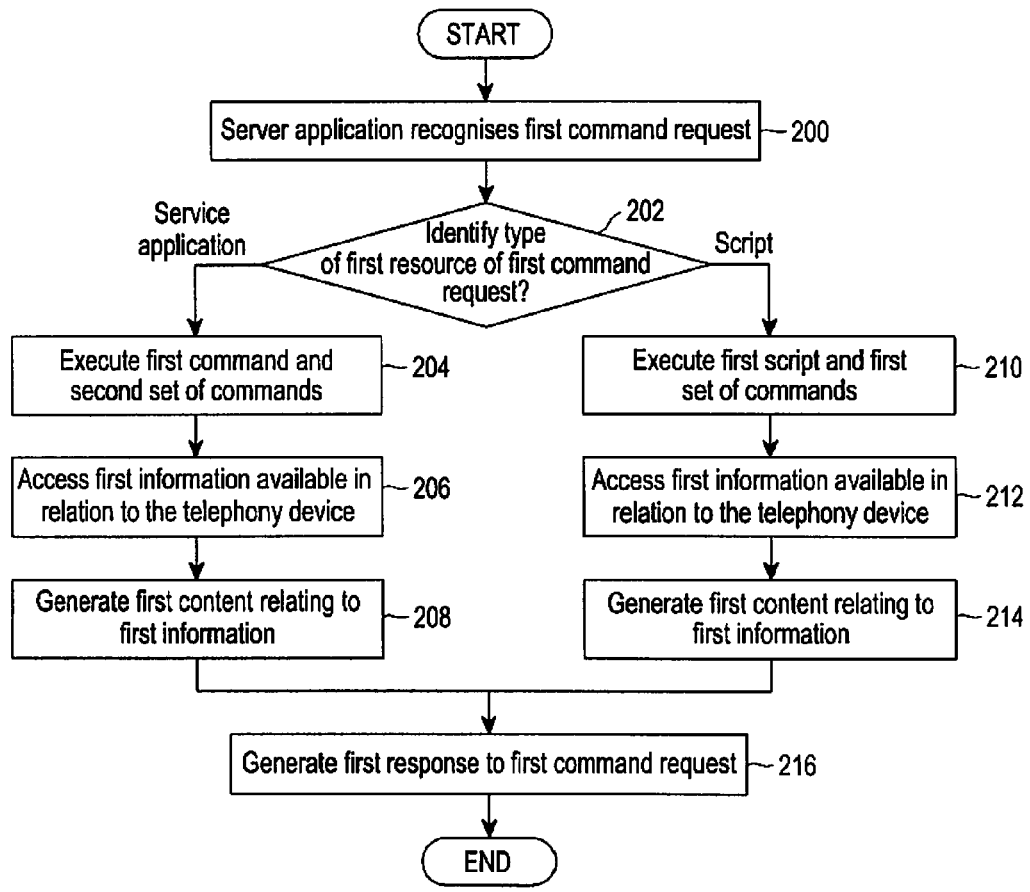
FIG. 2a illustrates steps performed by a server application of a telephony device in accordance with an embodiment of the invention.

FIG. 2a illustrates steps performed by a server application of a telephony device in accordance with an embodiment of the invention. Specifically, FIG. 2a illustrates steps performed by the server application 120 for executing commands from the first plurality of commands of the service applications 124 and providing content that may include information relating to a user interface.

Referring to FIG. 2a, the server application 120 recognizes a first command request in step 200. For example, the server application 120 may recognize command requests using a first transfer protocol, for example, HTTP. The first command request may be received by the server application 120 from the browser application 122 running on the telephony device 100, or may be received from an external computing device 150.

The server application 120 may receive the first command request from the browser application 122 by the browser application 122 passing the first command request to the server application 120 using a method for inter-process communication provided by the operating system 118 of the telephony device. For example, the first command request may be passed from the browser application 122 to the server application 120 over TCP or UDP by the networking program of the operating system 118.

Alternatively, the server application 120 may receive the first command request from an external computing device 150 by the external computing device 150 transmitting the first command request over a communications network 140 to which the telephony device 100 is connected. For example, the first command request may be provided to the server application 120 over TCP or UDP via a communications network 140. The first command request may then be received by the network interface 112 of the telephony device 100 and passed to the server application 120.

Once the server application 120 has recognized a first command request as in step 200, in step 202, the server application 120 identifies the type of a first resource of the first command request, i.e., the type of resource that the server application 120 is instructing to execute a first set of commands from the first plurality of commands of the service applications 124, in order to control the functions of the telephony device 100.

The first command request may be in the form of an HTTP GET request that includes a Uniform Resource Locator (URL) or Uniform Resource Identifier (URI) that identifies the first resource that is instructed by the server application 120 to execute the first set of commands. The first resource may specify a first service application 124 and a first command, for example, by using the URL "/phonebook/Contacts", where the first service application is the contacts services and the first command is one named "Contacts". Alternatively, the first resource may specify a script that may be instructed by the server application 120 to execute the first set of one or more commands, for example by using the URL "/phonebookApp.php".

Each of the commands in the first set of commands is a command of the first plurality of commands of the service applications 124, and is executed in response to instructions made by the server application 120 using one of the service applications 124 in either steps 204 and 206 or step 214, depending on the type of the first resource, as will be explained in greater detail below.

The first resource identified by the first command request may identify a first service application 124 and a first command from the first plurality of commands, which the server application 120 may use to instruct the execution of the first set of commands. The first resource may identify both first the service application 124 and the first command by using a URL that includes the name and path of the first service application 124 and the first command in a HTTP POST request made to the server application 120. For example, the first resource may identify the first service application 124 and the first command by using the URL "/messaging/sms", where "/messaging" represents the name of the messaging service 128, and "sms" represents the name of the first command.

Data may be passed to the first command in the POST request. For example, the phone number and message text to use in sending an SMS message may be specified using the POST data "number=012345&msgTxt=Hi" in the message body of the POST request.

If the server application 120 identifies the type of the first resource as a first service application 124 and a first command in step 202, in step 204, the server application 120 instructs the first service application 124 to execute the first command, by the server application 120 using one of the methods by which the first plurality of commands are made available for execution by other programs. For example, the server application 120 may take advantage of a common interface between it and the first service application 124, such as pipes, sockets, shared memory, CGI or FastCGI, in order to instruct the first service application 124 to execute the first command.

The first command may, when executed by the first service application 124, execute a second set of commands belonging to the first plurality of commands of the service applications 124. The first set of commands executed in response to the instructions of the server application 120 may thus include the first command and the second set of commands, if the type of the first resource is identified as a first service application 124 and a first command in step 202. The first set of one or more commands may control the functions of the telephony device 100, as described above for the first plurality of commands of the service applications 124.

In response to executing the first set of one or more commands in step 204, the first service application 124 may access first information available in relation to the telephony device 100 in step 206. The first information may include a set of portions of information returned by the execution of the first set of commands in step 204. Each command in the first set of commands executed in step 204 may return one of the portions of information in the set of portions of information, where each portion of information may indicate the success or failure of the execution of the command.

Additionally each portion of information may return data regarding the status of the telephony device 100, and/or data stored on the telephony device 100 (e.g., in the RAM 108 or in the non-volatile storage 106) and/or data received via the communications network 140. Examples of the first information may include entries from a list of contacts maintained by the contacts services 130, messages received by the telephony device 100 such as SMS messages or emails received by the messaging services 128, and/or multimedia files provided by the media services.

If the second set of commands executed in step 206 includes at least one command, portions of information resulting from the execution of the second set of commands may be processed during the execution of the first command and used to form the first information along with the portion of information resulting from the execution of the first command. Otherwise, if the second set commands executed in step 206 is empty, the first information may be gathered and processed using the portion of information resulting from the execution of the first command only.

The first service application 124 may then use the service application 124 that executed the first command in the first set of commands in step 204, in order to access the first information, which is returned by the execution of the first command.

In step 208, the first service application 124 generates first content relating to the first information. The first information accessed as a result of the execution of the first set of commands may be processed by the service application 124 that executed the first command and may then be used to form the first content that is generated by that service application 124, for example, by the service application 124 representing the first information as programmatic information in a structured data format such as JavaScript Object Notation (JSON) or eXtensible Mark-up Language (XML). This programmatic information may include the first information, or it may include processed information resulting from the processing of the first information. The programmatic information may be processed later by a program (such as the browser application 122, or a script interpreted by the server application 120, or a suitable program running on the external computing device 150) that receives the first content in order to update a first user interface.

The first content may be returned to the server application 120 from the service application 124 by using an appropriate method of inter-process communication, for example, the service application 124 may take advantage of a common interface between it and the server application 120 such as pipes, sockets, shared memory, CGI or FastCGI.

However, when the server application 120 identifies the type of the first resource of the first command request as a script in step 202, the server application 120 may use an interpreter program to load and interpret the first script in order to instruct the script to execute the first set of one or more commands in step 210.

A first script may be identified as the first resource of a command request by for example using the URL "/phonebookApp.php" in an HTTP GET request made to the server application 120. Data may be passed to the server application 120 for use by the first script by using parameters in the URL of the first resource, for example, by using the URL "/phonebookApp.php?sort=byName". The first script may be in the form of a computer program that may be instructed by the server application 120 to execute the first set of commands.

Scripts that the server application 120 may be configured to use in this way may include PHP: Hypertext Preprocessor (PHP) scripts and/or JavaServer Pages (JSP) scripts and/or Ruby on Rails scripts, which may each be executed by an appropriate interpreter program. The server application 120 may request that an interpreter program interpret the first script by instructing the operating system 118 to start the interpreter program with a particular set of parameters specifying the first script.

Alternatively, the server application 120 may communicate with an instance of the interpreter program running on the processor 102 using a method for inter-process communication made available by the operating system 118, for example, the server application 120 may take advantage of a common interface between it and the appropriate interpreter program such as pipes, sockets, shared memory, CGI or FastCGI, in order to instruct the instance of the interpreter program to interpret the first script.

During interpretation of the first script by an interpreter program, commands in the first plurality of commands may be executed in order to control the functions of the telephony device 100. The execution of commands in the first plurality of commands may be requested by using code in the first script that passes command requests to the server application 120. For example, the script may be configured to pass a command request in the form or an HTTP GET request to the server application 120 by using a method for inter-process communication provided by the operating system 118 of the telephony device 100 such as via TCP or UDP and the networking program of the operating system 118. Alternatively, the script may be configured to pass command requests to the server application 120 via a common interface between it and the server application 120, such as pipes, sockets, shared memory, CGI or FastCGI.

Each command request made by the first script to the server application 120 may identify a resource that is a service application 124 and a command. The server application 120 may instruct the service application 124 execute the command by the server application 120 using one of the methods by which the first plurality of commands are made available for execution by other programs. For example, the server application 120 may take advantage of a common interface between it and the appropriate service application 124, such as pipes, sockets, shared memory, CGI or FastCGI, in order to instruct the service application 124 to execute the command. The first set of commands may thus include each of the commands that are executed by the server application 120 as a result of command requests made to it in the first script in this way.

A command request made by the first script may identify a resource that is a second script which may be used by the server application 120 to execute an additional set of commands (i.e., by the second script making command requests identifying service applications 124 that may be used to execute commands and/or further scripts). Thus, the first set of commands may also include sets of commands executed by service applications 124 specified in command requests made by further scripts that are interpreted as a result of command requests made by the first script.

In response to executing the first set of one or more commands in step 210, the service applications 124 may access first information available in relation to the telephony device 100 in step 212. The first information may include a set of portions of information returned by the execution of the first set of commands in step 210. Each command in the first set of commands executed in step 210 may return one of the portions of information in the set of portions of information, and each portion of information may therefore indicate the success or failure of the execution of the command.

Additionally each portion of information may return data regarding the status of the telephony device 100, and/or data stored on the telephony device 100 (e.g., in the RAM 108 or in the non-volatile storage 106) and/or data received via the communications network 140. Examples of the first information may include entries from a list of contacts maintained by the contacts services 130, messages received by the device such as SMS messages or emails received by the messaging services 128, and/or multimedia files provided by the media services.

For each command in the first set of commands, the service application 124 that executed that command may access the portion of information returned by the execution of that command. Thus, the first information accessed by the server application 120 is formed of the portions of information returned to the service application(s) 124 in response to the execution of the first set of commands.

The service applications 124 may then generate first content relating to the first information in step 214. The first information accessed in step 212, as a result of the execution of the first set of one or more commands, will first be passed to the server application 120. The first information may be passed to the server application 120 from each service application 124 by using an appropriate method of inter-process communication, for example, the service application 124 may take advantage of a common interface between it and the server program 120 such as pipes, sockets, shared memory, CGI or FastCGI.

The first information may be formed of portions of information obtained as a result of the execution of each command in the first set of commands. Each of these portions of information may be passed separately to the server application 120 in a structured data format such as JSON or XML, and the server application 120 may then pass each portion of information to the script that made the command request which resulted in the accessing of that portion of information, i.e., either the first script specified in the first command request or further scripts interpreted in response to command requests made by the first script, as appropriate.

Alternatively, each portion of information may be passed separately to the server application 120 from each service application 124 in the message body of an HTTP POST request, where the portion of information may be encoded using URL encoding (i.e. 'percent encoding'), as a Comma Separated Values (CSV) format or in a packed binary format.

These portions of information may be returned to the appropriate script from the service application 124 by using an appropriate method of inter-process communication, for example, the service application 124 may take advantage of a common interface between it and the interpreter program (i.e., that is interpreting the script) such as pipes, sockets, shared memory, CGI or FastCGI.

Each script that receives a portion of information may then process that portion of information and use it to generate a portion of content. For example, the portion of information which is represented in a structured data format might be processed, and/or formatted and inserted by the script that is processing it into a Hyper Text Mark-up Language (HTML) document or used to determine the appearance of that document.

Each of the portions of content that are created by any further scripts interpreted in response to command requests made by the first script may be passed to the first script by first passing each of those portions of content to the server application 120 and the server application 120 then passing those portions of content to the first script. The passing of these portions of content between the further scripts, server application 120, and first script may be via an appropriate method of inter-process communication, for example, via a common interface between the server application and the interpreter programs (i.e., that are interpreting the scripts) such as pipes, sockets, shared memory, CGI or FastCGI.

In order to create the first content, the portions of content that are created by the first script are used in conjunction with any portions of content created by any further scripts interpreted in response to command requests made by the first script. The first content may be returned to the server application 120 from the first script by using an appropriate method of inter-process communication, for example, the interpreter program running the script may take advantage of a common interface between it and the server program 120 such as pipes, sockets, shared memory, CGI or FastCGI.

First content generated by a first resource that is a script in this way may include appearance information, programmatic information, and command information that may be used in order to provide a first user interface. The first information used to generate this content may be used to generate each of these types of information.

The appearance information included in the content may include display data relating to the appearance of a first user interface, such as display data that relates to the look and feel of the first user interface including the look and feel and layout of content and objects within the first user interface. The display data may also relate to the first information available in relation to the device accessed by the server application in step 212. For example, the first information may be the name of a contact that is making an incoming call, and the display data may include the first information, such that the name of the contact may be displayed in the first user interface. In another example, the first information may include the time of day and the display data may set the look and feel of the first user interface by including within the display data colors, icons (e.g., a sun or moon icon), etc., to be used in the first user interface in order to indicate the time of day.

The appearance information may be defined in a mark-up language such as HTML. This appearance information may be processed later by a program (such as the browser application 122 or a suitable program running on the external computing device 150) that receives the first content in order to display a first user interface.

The programmatic information included in the content may be in the form of scripts configured to manage the first user interface, and may be in the form of a scripting language such as JavaScript or Visual Basic Script (VB-Script) that is embedded within HTML content or instead may be in a separate JavaScript file. These scripts may be interpreted later by a program (such as the browser application 122 or a suitable program running on the external computing device 150) that receives the first content in order to update and/or manage a first user interface. The scripts may be used to manage the display of a user interface in response to user input, or in response to information received from the server application 120.

Additionally, the programmatic information included in the content may include the first information accessed in step 212, or it may include processed information resulting from the processing of the first information. For example, the programmatic information may be embedded in HTML content and/or represented in JSON or XML, as CSV, or encoded using URL encoding (i.e., percent encoding), or in another structured data format.

The programmatic information may be processed later by a program (such as the browser application 122 or a suitable program running on the external computing device 150) that receives the first content in order to update a first user interface.

The command information included in the content may include a set of command requests that may be used in response to interactions with the user interface made by a user, or in response to service events, in order to retrieve further content or update the user interface, as will be explained in further detail below.

The command information may be in the form of hyperlinks within HTML content, and/or may be in the form of instructions within the scripts of the programmatic information to use command requests to retrieve content. This command information may be processed later by a program (such as the browser application 122 or a suitable program running on the external computing device 150) that receives the first content, in order to allow the program to make further command requests, in order to display a second user interface and/or in order to update a first user interface.

In step 216, the server application 120 generates a first response to the first command request, where the first response includes the first content generated in either step 208 or step 214. The first response to the first command request may be made using the same transfer protocol by which the first command request was provided to the server application 120, for example, the first response could be an HTTP response to the HTTP request that includes the first command request, where the first command request was made by either the browser application 122 or an external computing device 150 as described above.

The first response to the first command request is either passed (in the case of the browser application 122) or transmitted (in the case of the external computing device 150) to the originator of the first command request, in order for the originator of the request to process the first content in the first response.

If the server application 120 receives the first command request from the browser application 122, the first response is passed back to the browser application 122 in order for the browser application 122 to process the first content in the first response, in order to display on the display device 116 a first user interface, which is indicative of the first information, which the first content may include. For example, the first response may be passed back to the browser application 122 from the server application 120 over TCP or UDP by the networking program of the operating system 118.

If the server application 120 received the first command request from an external computing device 150, the first response is transmitted, by the server application 120, back to the external computing device 150 via a communications network 140 to which the telephony device 100 is connected (i.e., by the server application 120 using the network interface 112). For example, the first response may be transmitted back to the external computing device 150 over TCP or UDP via the communications network 140.

The server application 120 may also be arranged to provide static content retrieved from files that are specified in command requests made to the server application 120 by either the browser application 122 or the external computing device 150. Static content may not change over time, e.g., from one command request to another. For example, static content includes HTML documents, Cascading Style Sheets (CSS) documents JavaScript programs, and/or multimedia files that may be requested from the server application 120 in a command request provided to it using HTTP (e.g., using a URL that includes the name and path of the required document e.g. "/help/index.html" in a HTTP GET request). The server application 120 may provide this static content in order to provide multimedia to enhance a user interface, or to provide static HTML, CSS, or JavaScript documents for use in displaying and/or managing a user interface, where the user interface may be displayed in either the browser application 122 or by the external computing device 150.

The browser application 122 may be an Internet browser application that is able to request and retrieve content using a transfer protocol, for example, using HTTP. Once content has been retrieved by the browser application 122, it processes the required content and uses the graphics processing device 114 to display the processed content on the display device 116, in order to display a user interface.

The browser application 122 may display user interfaces that are described in a mark-up language, such as, for example, HTML. The links, buttons, and other objects displayed in a particular user interface may be used by a user of the telephony device 100 to control the functionality of the telephony device 100 using the input devices, as will be explained in more detail below.

Figure 2B:
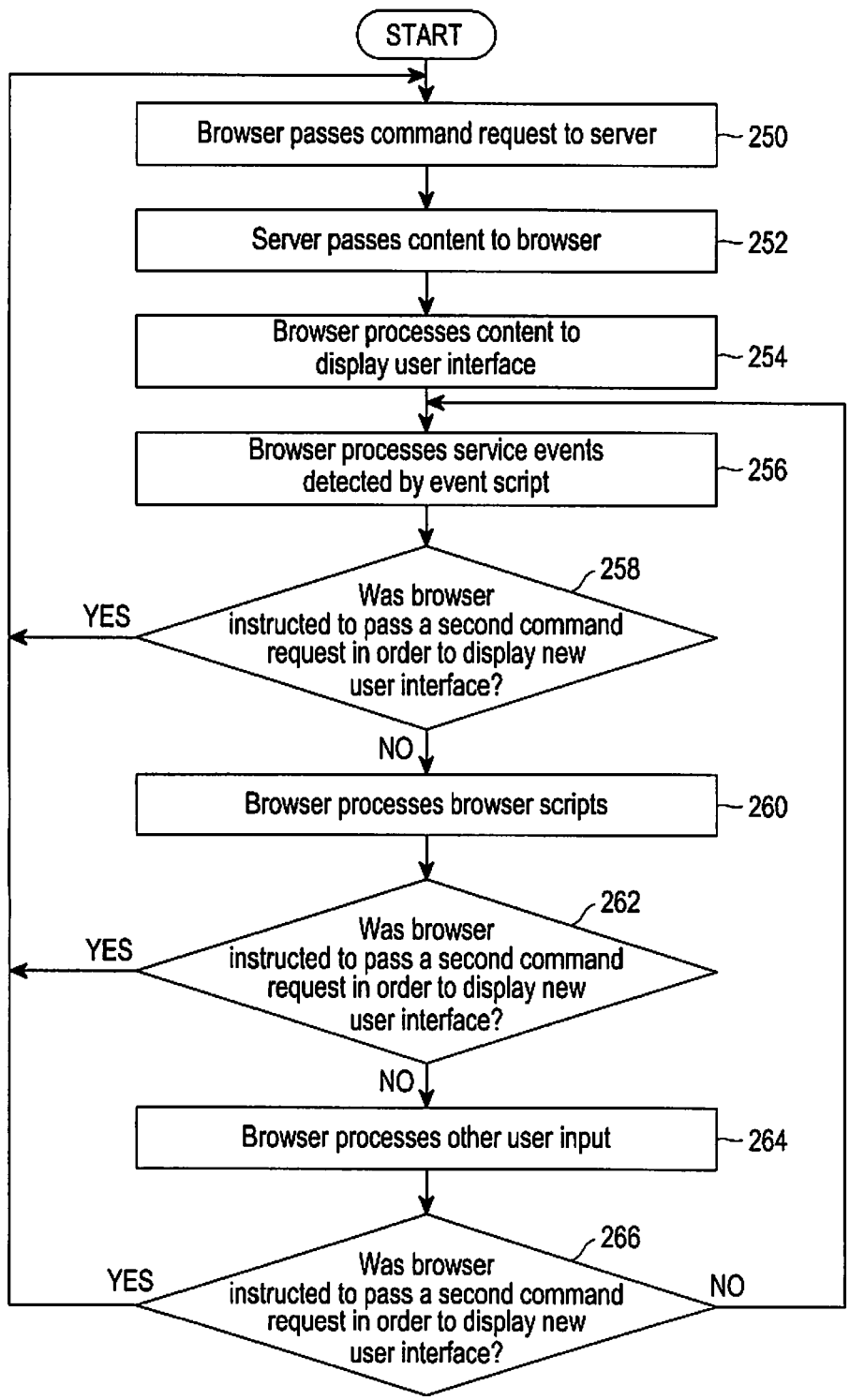
FIG. 2b illustrates steps performed by a browser application of a telephony device in accordance with an embodiment of the invention.

FIG. 2b illustrates steps performed by a browser application of a telephony device in accordance with an embodiment of the invention. Specifically, FIG. 2b illustrates steps performed by the browser application 122 in order to display a user interface on the display device 116 of the telephony device 100.

Referring to FIG. 2b, in step 250, the browser application 122 passes a first command request to the server application 120 using a first transfer protocol, for example, an HTTP GET request. As described above from the point of view of the server application 120, the browser application 122 may provide command requests to the server application 120 using a method for inter-process communication provided by the operating system 118 of the telephony device. For example, the first command request may be passed from the browser application 122 to the server application 120 over TCP or UDP by the networking program of the operating system 118.

The first command request passed by the browser application 122 to the server application 120 in step 250 may include a URL or URI identifying a resource that is a script. For example, when the browser application 122 is first loaded, after the telephony device 100 is turned on and the operating system 118 has been started, the browser application 122 may be configured to send a command request to the server application 120 that includes the URL "http://phoneServer/homeScreen.php", in order to allow the browser application 122 to display an initial user interface.

In order to pass a first command request that includes a URL such as "http://phoneServer/homeScreen.php" from the browser application 122 to server application 120, the browser application 122 may recognize that the command request should be made via the HTTP protocol (i.e. due to "http://" in the above URL), may then use the networking program of the operating system 118 to determine that the server application 120 should be passed the command request (e.g., as the networking program may include or use a nameserver function to resolve "phoneServer" into the Internet Protocol (IP) address of the server application 120), and may thus pass the command request to the server application 120.

The server application 120 may then use the script identified in the command request to execute a first set of commands, access first information available in relation to the telephony device 100, and generate first content relating to the first information, in accordance with steps 210 to 214, as illustrated in FIG. 2a.

In step 252, the first content is then passed from the server application 120 to the browser application 122 in a first response to the first command request using the first transfer protocol.

Once the browser application 122 receives the first content from the server application 120, it may process the first content in order to display a first user interface, which is indicative of the first information accessed by the server application in step 212, in step 254.

The first content received by the browser application 122 may include appearance information (which may be encoded in HTML) that the browser application 122 will process in order to display a first user interface including text, hyperlinks, forms, buttons, etc.

The first content may include programmatic information that includes browser scripts (for example JavaScript) which the browser application 122 may interpret in order to manage the display of the first user interface, for example, by re-arranging or updating elements of the first user interface in response to user input.

The first content may also include command information including a set of command requests. The browser application 122 transmits, to the server application 120, the command requests in the set of command requests of the command information, in response to the user interacting with the first user interface. For example, a command request may be passed to the server application 120 in response to the user selecting a hyperlink or a button, or by submitting a form using the first user interface.

The browser scripts in the programmatic information of the first content may also pass command requests in the set of command requests of the command information to the server application 120, in response to events detected by the browser scripts, such as user input or programmatic conditions detected by the one or more browser scripts.

The appearance information may include instructions to the browser application 122 to make further command requests to the server application 120 in order to retrieve additional content such as additional appearance information, additional programmatic information, and/or additional command information, which the browser application 122 may also process in order to display the first user interface. Additional content may be received in the form of files or documents, such as HTML documents, JavaScript documents, and/or multimedia files, which may include the information, and may be used, for example, to display a first user interface that includes a plurality of HTML documents (e.g., using different documents in different frames), and/or to display images in the first user interface, etc.

The browser application 122 may maintain a cache (e.g., in the RAM 108 or in the non-volatile storage 106) of some of the content and/or information it has previously received from the server application 120, such that it may retrieve some of this content and/or information from the cache, rather than requesting it from the server application 122 during later requests.

In step 256, the browser application 122 execute a service event script included in the programmatic information in order to detect service events occurring in relation to the service applications 124 of the telephony device 100. For example, the service event script may be in the form of JavaScript embedded in the first content received in step 252, or may be a separate JavaScript file received by the browser application 122 in response to a request for further content made by the browser application 122 in step 252. The service event script may be interpreted by the browser application 122 in order to control the update of the first user interface provided by the browser application 122 in response to service events.

The service event script may detect service events by initially passing a first event command request to the server application 120. This first event command request passed to the server application 120 may include a URL or URI identifying a resource that is a service application 124 and a first event command. The service application 124 identified in the first event command request may be the event services 138, and the first event command may be a receive new events command of the event services 138. Accordingly, the server application 120 instructs the event services 138 to execute the first event command according to steps 200 to 208 and 216, as illustrated in FIG. 2a.

The execution of the receive new events command of the event services 138 returns to the server application 120 first new event content, which may include programmatic information represented in a structured data format relating to new service events that have recently occurred. The new event content will then be passed to the service event script being interpreted by the browser application 122 in a first new event response. If no new service events have occurred, the receive new events command of the events service 138 may not return any content to the server application 120 until a new service event has occurred, such that the server application 120 does not provide the first new events response, until a new service event has occurred.

The service event script may then use the programmatic information included in the first event response to update the first user interface. For example, the programmatic information may indicate that the network interface 112 of the telephony device 100 has connected to a communications network 140 such as a wireless network, which may be displayed in the first user interface by showing an icon or image in a particular area of the first user interface. The service event script may then pass a second event command request to the server application 120 in order to detect further service events.

In order for the first event script to pass command requests to the server application 129 to update the first user interface, the first event script and server application 120 may operate according to the Asynchronous JavaScript and XML (AJAX) framework, in order to update the display and behavior of the first user interface in the background, i.e., without the browser application 122 entirely re-loading the first user interface from the server application 120.

The programmatic information included in the first event response may indicate that the browser application 122 should pass a second command request to the server application 120, in order to access information and display a second user interface in response to a service event, where the second user interface may replace the first user interface (step 258). In this case the programmatic information may include a URL or URI that the browser application 122 may use to make the second command request. This allows the server application 120 to notify the browser application 122 of an event that requires a new interface to be displayed. For example, when the user is using a first user interface displayed by the browser application 122, if the telephony device 100 receives an incoming telephone call, a service event may be triggered in order to instruct the browser application 122 to load a second user interface from the server application 120 which includes information relating to the incoming call and hyperlinks and/or buttons associated with command requests that may allow the user to accept or reject the incoming call.

In step 258, if the first event response indicates that the browser application 122 should pass a second command request to the server application 120 in order to display a second user interface, the browser will return to step 250 so that it may do so, otherwise, it will continue to step 260.

In accordance with another embodiment of the present invention, the browser application 122 may execute service event scripts included in the programmatic information in order to detect service events occurring in relation to the service applications 124 of the telephony device 100. Each service event script may detect service events according to the steps described above. Each event command request passed to the server application 120 by a service event script may indicate that the service event script wishes to receive information relating to the service events of a specific service application 124. For example, a service event script may indicate that it wishes to receive information relating to the service events of the messaging services 128 so that it may display a notification, if a new SMS message is received.

In step 260, the browser application 122 processes updates to the first user interface made by the browser scripts. As described above, the browser scripts may be configured to pass command requests from the command information to the server application 120 in response to events detected by the browser scripts, such as user input or other programmatic conditions.

Command requests passed to the server application 120 by a first browser script may be used to instruct the server application 120 to access information in relation to the telephony device 100 and in response update the first user interface. A command request used to update the first user interface in this way may include a URL or URI identifying a resource that is a service application 124 and a first update command. Therefore, the server application 120 will instruct the specified service application 124 to execute the first update command according to steps 200 to 208 and 216, as illustrated in FIG. 2a. In accordance with those steps, the execution of the first update command will return to the server application 120 first update content, which may include programmatic information represented in a structured data format. The first update content will then be passed to the first browser script being interpreted by the browser application 122 in a first update response. The first browser script may then use the programmatic information included in the first update response to update the first user interface. For example, the programmatic information may include a list of contacts and their telephone numbers, which the first browser script may format and display using an HTML table in the first user interface.

In order for browser scripts to pass command requests to the server application 120, in order to update the first user interface, the browser scripts and the server application 120 may operate according to the AJAX framework, in order to update the display and behavior of the first user interface in the background, i.e., without the browser application 122 needing to entirely re-load the first user interface from the server application 120.

Command requests passed to the server application 120 by a browser script may alternatively be used to instruct the server application 120 to access information in relation to the telephony device 100 and in response provide a second user interface for display by the browser application 122, where the second user interface may replace the first user interface. This may be used, for example, to provide a second user interface, if certain programmatic conditions tested by the browser script are met.

In step 262, if the browser application 122 was instructed by a browser script to pass a second command request, the browser application will pass the second command request to the server application 120 and prepare to display this second user interface in step 250; otherwise, it will continue to step 264.

In step 264, the browser processes any other user input, where the user input has not already been processed by the browser scripts in step 260, such as, for example, the user selecting an item in the user interface associated with a command request (i.e., where the command request forms part of the set of command requests of the command information). Examples of items the user may select that may be associated with command requests include hyperlinks, buttons, forms, etc. If the user has selected an item associated with a command request, the command request may be used by the browser application 122 to instruct the server application 120 to access information in relation to the telephony device 100 and in response provide a second user interface for display by the browser application 122, where the second user interface may replace the first user interface. For example, this may be used to provide a second user interface allowing the user to enter an SMS message to a particular contact that was selected from a list of contacts presented in a first user interface.

In step 266, if the browser application 122 processed other user input selecting an item in the user interface that indicates that the browser application 122 should pass a second command request to the server application 120 in order to display a second user interface in step 264, the browser application passes the second command request to the server application 120 and prepares to display this second user interface in step 250; otherwise, it will return to step 256, in order to continue processing service events.

The display of user interfaces on the telephony device 100 using the server application 120 and browser application 122 described above has several advantages. First, it is possible to control the telephony device 100 by making command requests via the first transfer protocol, which may be a well known transfer protocol such as HTTP. This allows requests for the execution of commands in the first plurality of commands to be made using a well known transfer protocol available for use in existing browsers and by scripts that may run in those browsers.

The granularity of control over the functions of the telephony device 100 offered by the first plurality of commands could be very fine, allowing detailed control of the telephony device 100 using command requests passed to the server application 120 via a first transfer protocol (such as HTTP). The first plurality of commands may thus provide an Application Programming Interface (API) for controlling the functions of the telephony device 100 via HTTP. The provision of information and/or results available as a result of the execution of the first plurality of commands may be returned to the entity passing the command requests in a structured data format via responses using first transfer protocol (such as HTTP responses).

In accordance with an embodiment of the present invention, complex user interfaces may be created that incorporate scripts interpreted by the browser application 122 that may be used to enhance user interaction with the user interfaces. These scripts may be used to update portions of a user interface in response to user input with new information or with required information, and/or may be used to update portions of these user interfaces in response to service events occurring in relation to the service applications 124.

Another advantage of the present invention is the separation of the programmatic commands for controlling the functions of the telephony device 100 (i.e., provided by the first set of one or more commands of the service applications 124) from those used to generate the user interface (i.e., the scripts executed by the server application 120) and those for displaying the user interface (i.e., by the browser application 122). This allows the design of each of these components to be undertaken separately and for new user interfaces for the telephony device 100 to be designed easily using well known tools, transfer protocols, etc.

In accordance with an embodiment of the present invention, a user interface can be highly customized in accordance with information available in relation to the device that is accessed in response to execution of one or more of the first set of commands. For example, the appearance of the user interface displayed in the browser application may be changed (using the scripts interpreted by the server application 120 and/or those interpreted by the browser application 122) according to the time of day, or the location of the telephony device 100 (which may be determined by the location services 132 using the location receiver device (not shown) within the telephony device 100), etc.

It is not necessary for the browser application 122 to use any command requests to the server application 120 that specify resources that are scripts, in order to control the functionality of the telephony device 100 or display a user interface. Therefore, in accordance with another embodiment of present the invention, the browser application 122 does not have to display a user interface that includes content formatted using HTML provided by the server application 120, but may instead display a user interface whose appearance is determined using one or more scripts and/or procedures of the browser application 122. For example, the browser application 122 is not necessarily an Internet browser displaying content formatted using HTML, but may use command requests that specify resources that are service applications 124 and commands only, and that are passed to the server application 120 to execute sets of commands and access information in relation to the telephony device 100 as content in a structured data format such as XML or JSON. The browser application 122 may process and insert this information into a custom user interface that is displayed without retrieving any appearance information from the server application 120, i.e., all decisions made in relation to the appearance of the user interface may be made by the browser application 122.

As described, the server application 120 may also recognize command requests that it has received from an external computing device 150. The external computing device 150 may run a second browser application that operates in a similar way to the browser application 122 of the telephony device 100, i.e., as illustrated FIG. 2*b*, in order to display a user interface on a display device. Where the browser application 122 of the telephony device 100 communicates with the server application 120, e.g., by passing command requests to the server application 120 or by receiving from the server application 120 a response to a command request, the second browser application of the external computing device 150 instead communicates with the server application 120 by using the communications network 140, e.g., by sending HTTP requests over TCP. The telephony device 100 may be accessible to the external computing device 150 via the communications network 140, using, for example, a fixed IP address on the communications network 140 known to the external computing device 150, or by the telephony device 100 registering a current IP address by which it may be accessed with a known server accessible to the external computing device 150. Thus, the functionality of the telephony device 100 may be completely controlled using an external computing device 150 that may display substantially the same user interface as that displayed by the browser application 122, i.e., as both user interfaces are provided in content generated by the server application 120.

In accordance with another embodiment of the present invention, a user interface program running on the external computing device 150 may display a user interface whose appearance is determined using scripts and/or procedures of the user interface program. For example, the user interface program is not necessarily an Internet browser that displays content formatted using HTML, but may use command requests that specify resources that are service applications 124 and commands only, and that are transmitted to the server application 120 via the communications network 140 to execute commands and access information in relation to the telephony device 100 as content in a structured data format, such as XML or JSON. The user interface program may process and insert this information into a custom user interface that it is displayed on a display device of which the external computing device 150 may include or to which it may be connected, without the user interface program retrieving any appearance information from the server application 120, i.e., all decisions made in relation to the appearance of the user interface are made by the user interface program. Thus, a user may control the telephony device 100 from an external computing device 100 using a custom user interface presented by a user interface program running on the external computing program.

In accordance with another embodiment of the present invention the external computing device 150 may include a web control service that controls the functionality of the telephony device 100 and generates content for use in displaying a user interface using a personal computer.

The web control service may use command requests transmitted to the server application 120 via the communications network 140 to execute one or more of the first set of service commands and access information in relation to the telephony device 100 as content in a structured data format, such as XML or JSON. The web control service may process this information and insert it into web content that it may provide to a personal computer, such that the web content may be displayed on a display device to which the personal computer is connected, without the web control service retrieving any appearance information from the server application 120. Thus, all decisions made in relation to the appearance of the user interface may be made by the web control service. Therefore, a user may control his telephony device 100 from a personal computer by using a custom user interface presented on the personal computer, where the custom user interface includes content generated by the web control service running on the external computing device 150. Accordingly, a custom user interface by which the telephony device 100 may be controlled may be incorporated into, for example, an Internet webpage being viewed by a user of the telephony device 100 on a personal computer.

For example, a custom user interface for controlling the telephony device 100 could be included in Internet webpages that are presented to the user when viewing a Facebook® page on a personal computer, where the external computing device 150 (which may be one or more computer servers that also provide the content of the Facebook® page) provides the custom user interface. For example, the custom user interface may allow the user to make a mobile phone call using the telephony device 100, or to send an SMS message using the telephony device 100 to another user.

In accordance with another embodiment of the present invention, in step 216 of FIG. 2a, the server application 120 may pass the first response to the browser application 122 in response to a first command request received from, for example, an external computing device 150. The first response may include the first content generated by the server application in either step 208 or step 214. A second response that includes the first content may also be provided to the computing device 150. This allows the browser application 122 of the telephony device 100 to display a first user interface on the display device 116 of the telephony device 100 in response to a user controlling the functionality of the telephony device 100 using the external computing device 150. The first user interface displayed by the browser application may be indicative of the first information accessed by the server application 120 in response to the first command request in either step 206 or 212.

In accordance with another embodiment of the present invention, in step 216 of FIG. 2a, the server application 120 may pass a first event response to a service event script that is being interpreted by the browser application 122 in response to a first command request received from, for example, an external computing device 150. The first event response may include the first content generated by the server application in either step 208 or step 214. Alternatively, the first event response may include an indication to a service event script that the user interface displayed by the browser application 122 should be updated, for example, by providing a command request to the service event script that the service event script may instruct the browser application 122 to use in order to update the user interface displayed by the browser application 122.

Figure 3:
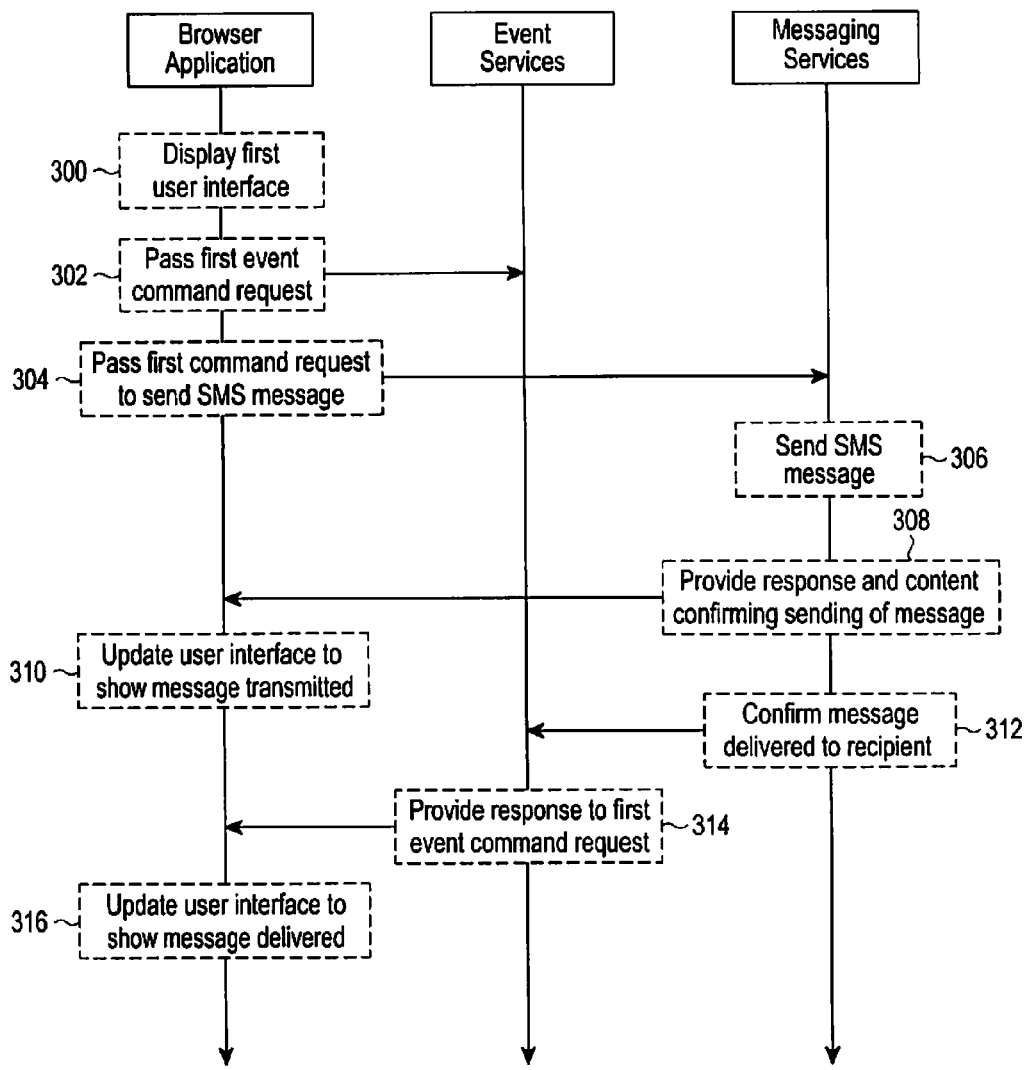
FIG. 3 illustrates steps performed by a browser application, event services, and messaging services of a telephony device in accordance with an embodiment of the invention.

FIG. 3 illustrates steps performed by a browser application, event services, and messaging services of a telephony device in accordance with an embodiment of the invention. Specifically, FIG. 3 illustrates steps carried out by the browser application 122, the event services 138, and the messaging services 128 in order to transmit a SMS message in response to input from a user into a first user interface, and in order to display an indication confirming delivery of the text message.

In step 300, the browser application 122 receives a first response that includes first content from the server application 120 and displays a first user interface using the first content.

The browser application 122 may also execute a service event script included in the programmatic information in order to detect service events occurring in relation to the service applications 124 of the telephony device 100. The service event script detects service events by passing a first event command request to the server application 120 in step 302. The first event command request passed to the server application 120 by the event script indicates that the service event script wishes to receive information relating to the service events of the messaging services 128, such that it may display a notification, if a new SMS message is received, or if a transmitted SMS message is successfully delivered.

The server application 120 may then instruct the events services 138 to execute the first event command request using the event services 138. When no new service events of the messaging services 128 have occurred, the receive new events command of the events service 138 may not return any content to the server application 120 until a new service event has occurred. Accordingly, the server application 120 does not provide the first new events response, until a new service event has occurred. Therefore, the first event command request remains pending while the events services 138 waits for a new event to occur. The first event command request may be configured to lapse, i.e., timeout, after a certain period of time, in which case, a new first event command request is passed by the service events script in order to replace the first event command request that has lapsed.

In the meantime, the user may use the first user interface to enter an SMS message. The user may select to send the SMS message using the first user interface by pressing a link or a button in the first user interface. This link or button may either cause the browser application 122 to pass a first command request to the server application 120, or cause a browser script running in the browser application to pass a first command request to the server application 120 in step 304. This first command request instructs the server application 120 to execute a first set of commands of the first plurality of commands in order to send the entered SMS message. The first command request may include data relating to the SMS message to be sent, for example the first command request may comprise a URL with a parameter containing the text of the SMS message to be sent, another parameter with the telephone number to send the SMS message to, etc.

The server application 120 may then process the first command request. The first command request indicates that the server application 120 should instruct the messaging services 128 to execute commands for sending the SMS message, so the server application 120 may request that the messaging services 128 execute the set of one or more commands of the first plurality of commands in order to send the entered SMS message. As a result of executing the set of commands, the messaging services may use the network interface 112 to transmit an SMS message including the text specified by the user to the specified telephone number in step 306.

The messaging services 128 then access information in relation to the telephony device 100, such as information relating to the successful (or otherwise) transmission of the SMS message by the network interface 112, and generate first content using this information, which is returned to the server application 120. In step 308, the server application 120 provides a first response including the first content to the browser application.

The browser application 122 then receives the first response and uses the first content to update the first user interface in order to show that the SMS message had been transmitted in step 310. For example, the first content may include programmatic information such as data in a structured data format that indicates that the SMS message has been transmitted, which may be used by a browser script running in the browser application 122 to update the first user interface.

In the meantime, the SMS message may be delivered by the communications network 140 to the telephone with the telephone number specified by the user. This may result in a confirmation of SMS message delivery being transmitted to the telephony device 100 via the communications network 140, which may be received by the network interface 112 and processed by the messaging services 128. The messaging services 128 then notifies the event services 138 of the confirmation of the delivery of the SMS message in step 312, for example by using a method for inter-process communication.

The event services 138 then identify that it is waiting for service events in relation to the messaging services 128. The event services 138 generates second content relating to the confirmation of the delivery of the SMS message, which is returned to the server application 120, such that it may provide a second response in step 314 that includes the second content to the service events script running in the browser application 122. The second response is a response to the first event command request.

In step 316, the service events script running in the browser application 122 receives the second response and uses the second content to update the first user interface in order to show that the SMS message has been delivered. For example, the second content may include programmatic information, such as data in a structured data format that indicates that the SMS message has been delivered, which may be used by the service events script to update the second user interface by displaying a delivery notification message.

Figure 4:
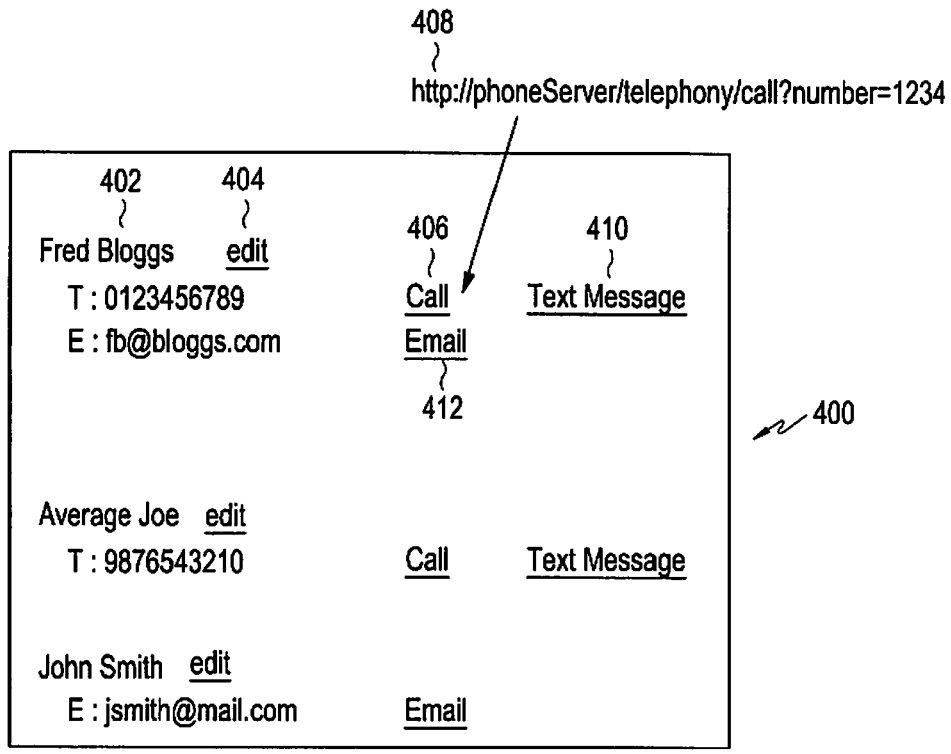
FIG. 4 illustrates a list of contacts displayed by a browser application of a telephony device in accordance with an embodiment of the invention.

FIG. 4 illustrates a list of contacts displayed by a browser application of a telephony device in accordance with an embodiment of the invention. Specifically, FIG. 4 illustrates screen 400 relating to a list of contacts resulting from the browser application 122 processing content in order to display a user interface that is indicative of information accessed in relation to the telephony device 100 by the server application 120.

Referring to FIG. 4, the screen 400 includes contact information, e.g., information retrieved from the non-volatile storage 106, which is indicative of information accessed in relation to the telephony device 100. The screen 400 includes a number of hyperlinks 404, 406, 410, and 412 that may each be associated with a command request, e.g., hyperlink 406 is associated with the command request 408, which is the URL "http://phoneServer/telephony/call?number=1234". If one of these hyperlinks is selected by the user, the browser application 122 may pass the command request to the server application 120 in order to update the user interface or display a new user interface.

Figure 5:
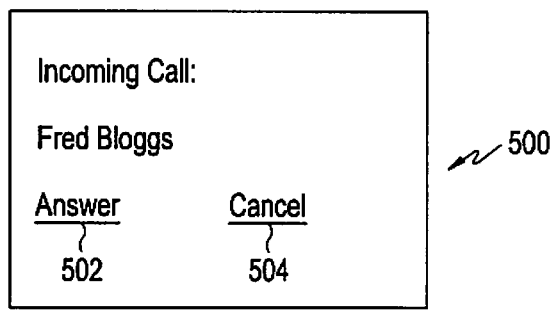
FIG. 5 illustrates an incoming telephone call displayed by a browser application of a telephony device in accordance with an embodiment of the invention.

FIG. 5 illustrates an incoming telephone call displayed by a browser application of a telephony device in accordance with an embodiment of the invention. Specifically, FIG. 5 illustrates screen 500 relating to an incoming telephone call resulting from the browser application 122 processing content in order to display a user interface that is indicative of information accessed in relation to the telephony device 100 by the server application 120.

Referring to FIG. 5, the screen is displayed by the browser application 122 as a result of a service event script (i.e., being interpreted by the browser application 122) receiving an event response from server application 120. The event response may have indicated that the browser application 122 should pass a command request to the server application 120 in order to access information and display the displayed user interface in response to a service event, or the event response may have included programmatic information that the service event script may have processed in order to update the displayed user interface with the displayed information relating to the incoming telephone call. The screen 500 includes a number of hyperlinks 502 and 504 that may each be associated with a command request. If one of these hyperlinks is selected by the user the browser application 122 passes the command request to the server application 120 in order to answer or cancel the incoming call (as appropriate) and update the user interface or display a new user interface.

Figure 6:
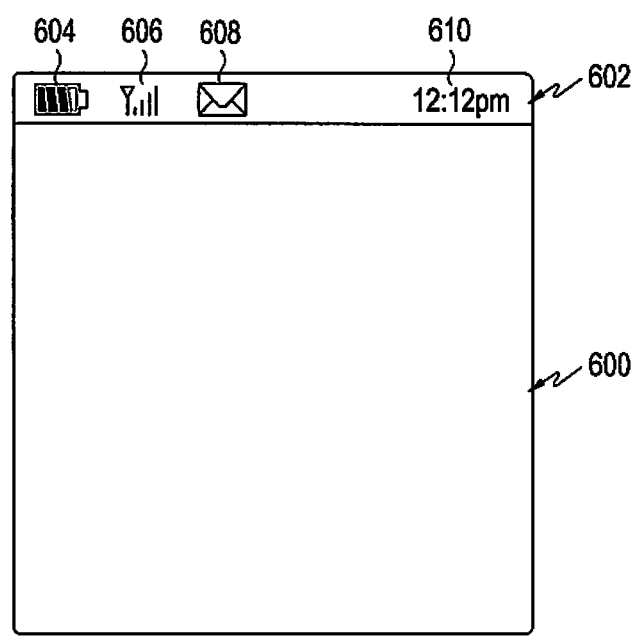
FIG. 6 illustrates a status bar displayed by a browser application of a telephony device in accordance with an embodiment of the invention.

FIG. 6 illustrates a status bar displayed by a browser application of a telephony device in accordance with an embodiment of the invention. Specifically, FIG. 6 illustrates a screen 600 that includes a status bar 602 resulting from the browser application 122 processing content in order to display a user interface that is indicative of information accessed in relation to the telephony device 100 by the server application 120.

Referring to FIG. 6, the screen include a plurality of HTML frames that were passed by the server application 120 to the browser application 122 as first content within a first response to a first command request made by the browser application 122. One of the HTML frames in the plurality of HTML frames is a status bar frame 602, which displays information indicative of information available in relation to the telephony device 100. The contents of the status bar frame may be updated by a service events script running in the browser application 122, in response to the service events script receiving new event content from the events service 138 in response to service events occurring in relation to the service applications 124. For example, such new event content may indicate that the operating system 118 has detected that the remaining battery power of the telephony device 100 has dropped, and may include content that may be used to update the battery level indicator 604.

Alternatively, new event content may indicate that the connectivity services 136 have detected that the level of connectivity of the telephony device 100 to a communications network has changed, and may include content that may be used to update the connection level indicator 606.

Alternatively, new event content might indicate a new SMS message, MMS message, or email has been received by the messaging services 128, and may include content that may be used to update the new message indicator 608.

Alternatively, new event content might indicate that the operating system 118 has detected that the time has changed, and may include content that may be used to update the time indicator 610.

The above-described embodiments of the present invention are to be understood as illustrative examples of the present invention. Further embodiments of the present invention are envisaged as follows.

In accordance with another embodiment of the present invention, the server application 120 and/or browser application 120 may not provide all of the functionality described above and/or may be further modified so that they may be used with a telephony device 100 that includes a processor 102 of comparatively lower performance. For example, some or all of the browser scripts may not be interpreted by the browser application 122, and/or scripts interpreted by the server application 120 for executing one or more commands and generating content may be simplified in order to provide a more basic user interface and reduce the processing burden on the processor 102.

In accordance with another embodiment of the present invention, the browser application 122 of the telephony device 100 may also be configured to request and receive second content from external devices by using the network interface 112 of the telephony device 100 to conduct communications via a communications network 140 with external devices, such as web servers using the same first transfer protocol as illustrated in FIGS. 2a and 2b, e.g., HTTP. Therefore, the browser application 122 may be used to provide access to Internet content provided by these external devices as well as to provide a user interface for use in controlling the functionality of the telephony device 100.

It is to be understood that the first transfer protocol used to pass command requests to the server application 120 (from either the browser application 122 or an external computing device 150) and used by the server application 120 to provide responses to the command requests may be either a secured transfer protocol, such as HTTP Secure (HTTPS), or an unsecured transfer protocol, such as HTTP.

Although the above-described embodiments of the present invention have been described with reference to the telephony device 100, the above-described embodiments of the present invention can also be applied to other devices that include a display and a processor, wherein such a device may be configured to run a server application and a browser application using the processor, and wherein the browser application may be configured to display a user interface on the display. The device may however include a different set of service applications (i.e., to the service applications 124 of the telephony device 100) that a different first plurality of commands that allow control of the functions of that device.

For example, such a device could be a television device or a set-top box for connecting to a television device that includes a video broadcast receiver. Such a device may include service applications such as video source selection services for changing a received video source of the video broadcast receiver (and thus changing the state of the video broadcast receiver), e.g., allowing the selection of different television channels and/or video input sources. Such a device may also include video playback services for decoding and playback of different types of video, and guide services for accessing and displaying a television listings guide using the network interface 112.

Other examples of the device may include a portable media player such as a portable music, picture and/or video player, or a portable electronic book reader, each of which may include service applications such as media services for storing, retrieving, editing, recording and/or playback of multimedia files and/or eBook services for storing, retrieving, editing, recording and/or playback of electronic book files.

In the examples above, the device may include configuration services, connectivity services and events services that provide substantially the same functionality as those of the telephony device 100.

Other examples of the device include a digital camera which may include service applications such as media services for storing, retrieving, editing and/or playback of multimedia files and/or camera services for controlling an image sensor, lens arrangement and/or other elements of the camera in order to take digital images.

In the examples above, the device may include configuration services, connectivity services and events services that provide substantially the same functionality as that of the telephony device 100.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A telephony device comprising:
   a display;
   a memory for storing data of a web browser application, a web server application, and a service application for services of the telephony device, executed by a processor;
   a network interface for communicating via a communications network; and
   the processor of the telephony device configured to:
      operate the web server application in the telephony device to provide instructions to the service application in response to a request received from the web browser application of the telephony device using a transfer protocol,
      operate the service application to provide a service of the telephony device by executing at least one function based on the instructions and provide information on the service according to the execution of the at least one function to the web server application, and
      operate the web browser application in the telephony device to receive a response of the request from the web server application of the telephony device, the response including at least part of the information on the execution of the at least one function.

2. The telephone device of claim 1, wherein the first transfer protocol comprises one of:
   HyperText Transfer Protocol (HTTP); and
   HTTP Secure (HTTPS).

3. The telephony device of claim 1, wherein the processor is configured to control the web browser application to transmit the request to the server application, according to a user input received through a user input interface in the telephony device.

4. The telephony device of claim 1, wherein the processor is configured to control the web server application to transmit the response to the web browser application using the transfer protocol.

5. The telephony device of claim 1, wherein the service application comprises at least one of:
   a telephony service for creating or receiving a telephone call using the network interface;
   a messaging service for sending or receiving a text message using the network interface;
   a connectivity service for connecting to or disconnecting from the communications network using the network interface;
   a social networking service for sending or receiving data to a social network using the network interface; and
   a video source selection service for changing a received video source using a video broadcast receiver.

6. The telephony device of claim 5, wherein the service application further comprises an event service, and
   wherein the processor is configured to control the service application to delay execution of the at least one function, until a service event occurs in relation to any of the at least one services included in the service application.

7. The telephony device of claim 6, wherein the service event comprises an occurrence of an incoming telephone call.

8. The telephony device of claim 6, wherein the service event comprises a detection of a predetermined new device location.

9. The telephony device of claim 1, wherein the processor is configured to determine whether the request identifies a first resource identifying the service application and a first command, or whether the request identifies a second resource including a first script.

10. The telephony device of claim 9, wherein the request identifies the second resource including the first script, and
    wherein the processor is configured to control the web server application to instruct an interpreter program to interpret the first script, in order to execute the at least one function.

11. The telephony device of claim 4, wherein the processor is configured to control the web browser application to display the information on the execution of the at least one function as a hyperlink.

12. The telephony device of claim 11, wherein the processor is configured to control the web server application to make a call or transmit a message to another telephony device corresponding to the hyperlink when receiving a selection of the hyperlink received through a user input interface in the telephony device.

13. The telephony device of claim 9, wherein, if the request identifies the first resource identifying the service application and the first command, the processor is configured to control the web server application to instruct the service application to execute the first command, in order to execute the at least one function.

14. The telephony device of claim 1, wherein the web browser application transmits the request to the web server application in response to a user input selecting a link or a button displayed on the display by the web browser application.

15. The telephony device of claim 1, wherein the response includes the information on the execution of the at least one function as a hyperlink, and the processor is configured to control the web server application to make a telephone call to another telephony device corresponding to the hyperlink when receiving information on a selection of the hyperlink from the web browser application.

* * * * *